Dec. 17, 1963  R. J. GOODMAN  3,114,562
LATCHES AND MECHANICAL COUPLINGS
Filed Sept. 6, 1960  2 Sheets-Sheet 2
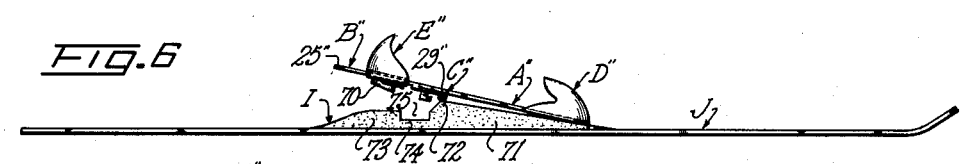
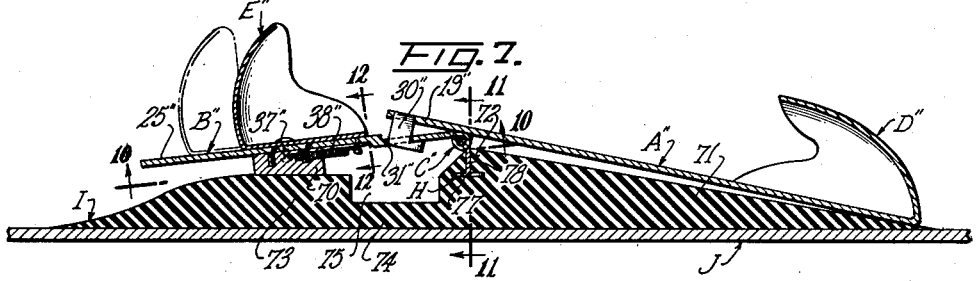
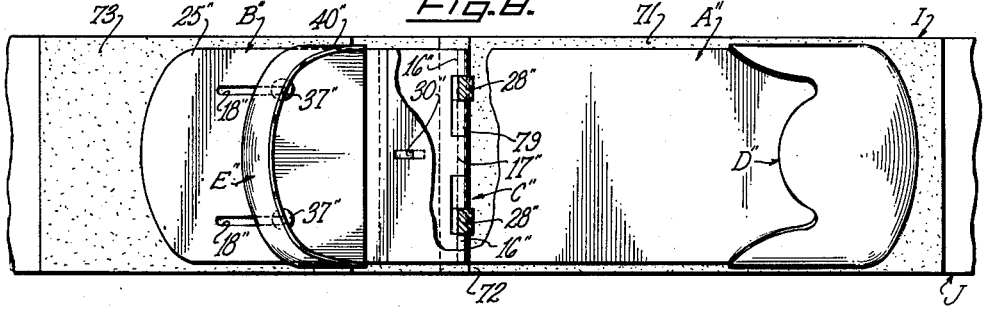
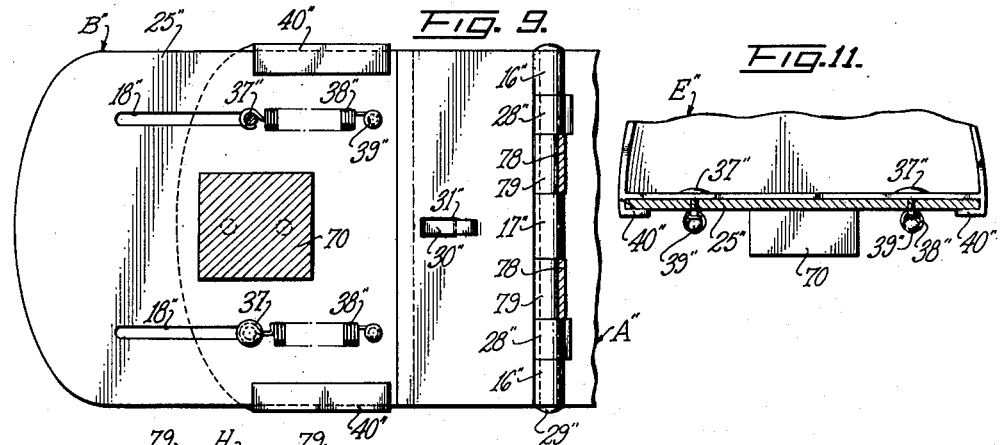
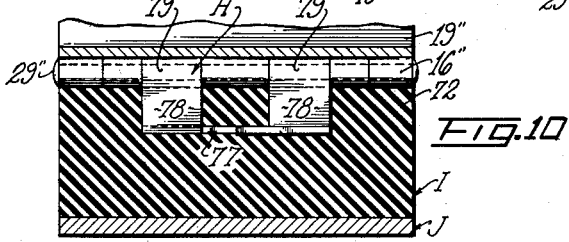
INVENTOR.
ROBERT J. GOODMAN
BY
ATTORNEY

United States Patent Office 3,114,562
Patented Dec. 17, 1963

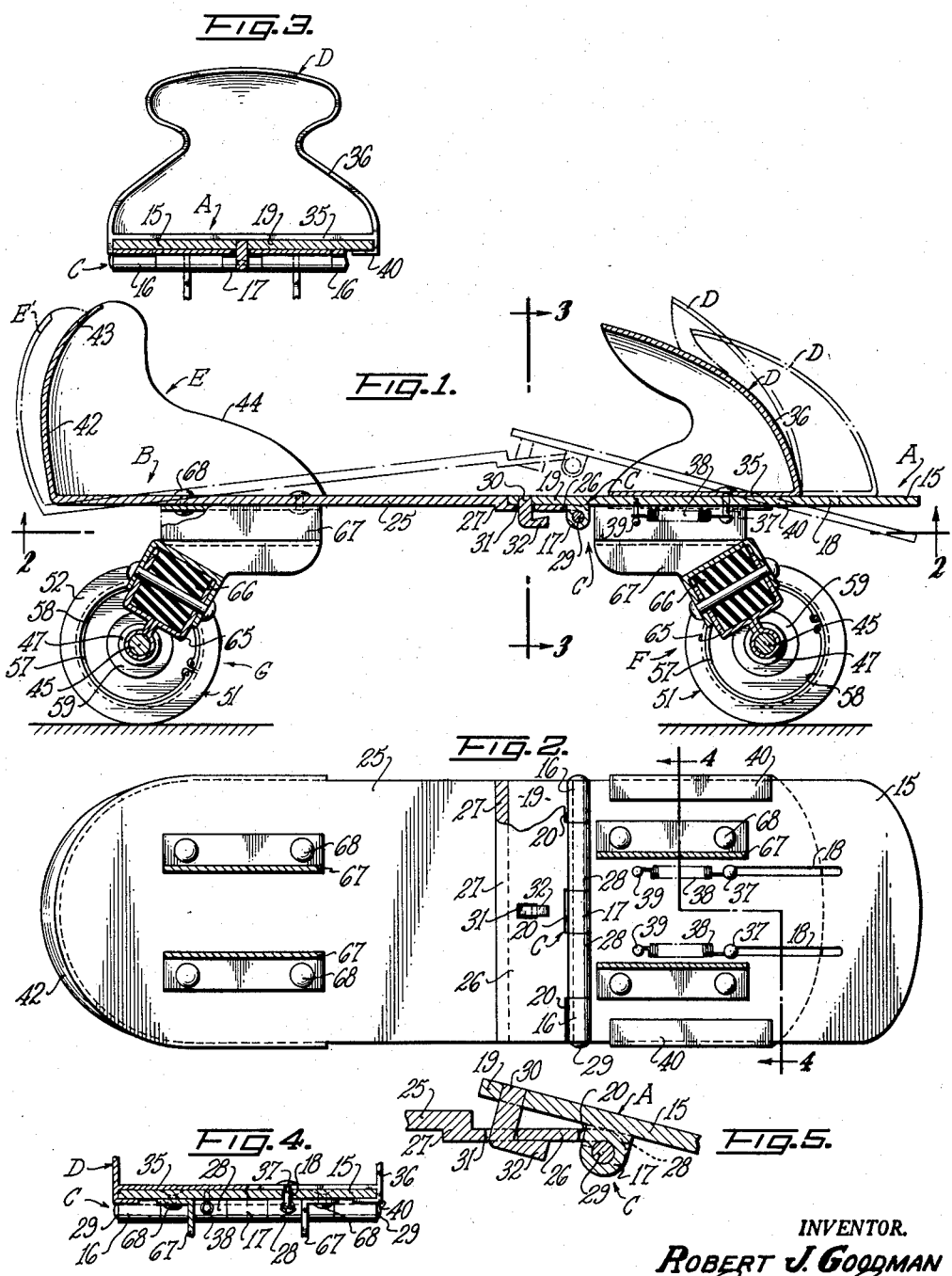

3,114,562
LATCHES AND MECHANICAL COUPLINGS
Robert J. Goodman, 137 N. La Brea Ave.,
Los Angeles 36, Calif.
Filed Sept. 6, 1960, Ser. No. 54,135
10 Claims. (Cl. 280—11.3)

This invention relates to latches and mechanical couplings, and has as its general object to provide an improved coupling wherein a pair of coupling jaws having a hinged connection to one another, are operable, in response to pressure applied to the coupling adjacent said hinged connection, to establish coupled attachment to an article applying such pressure.

While the invention is broadly applicable to any two articles designed to be coupled together to complete a combination apparatus for unified operation, the invention is particularly useful in the coupling of supporting devices such as skates, skis, casters, etc., to weight-loaded objects such as the feet or shoes (e.g. boots) of a skater or skier, and to various inanimate objects having casters, skids or feet for supporting the same upon a supporting surface. The invention is particularly applicable to the coupling of roller skates or ice skates to the shoes of a skater. It is also applicable to the coupling of skis to ski-boots. More generally, the invention may be applied to the coupling of casters to the lower ends of pianos and items of furniture, the coupling of supporting feet to scaffolds, ladders, and innumerable items of mechanism which are supported upon legs; the temporary coupling of dollies and small trucks to various weight items of mechanism for transporting them from place to place in a factory, and numerous other uses which will suggest themselves to persons skilled in the various arts in which detachable supports and other detachable couplings may be used to advantage.

The primary object of the invention is to provide a coupling mechanism which will effect the secure clamping of a supporting device to an object to be supported, without the aid of straps, keys, screw actuators or other devices requiring time for clamp-up operation.

More specifically, the invention aims to provide a coupling mechanism which is operable substantially instantaneously to receive, embrace, and clamp itself upon an object to be supported, without requiring the tightening of straps and securing of buckles or other like fasteners, or the time-consuming tightening of screw clamps or the like.

A further object is to provide such a coupling mechanism which is operable from open or release position to closed, clamping position, automatically in response to the application of weight-energized downward pressure thereto from the object to be supported (e.g. pressure from a skater's shoe developed by the weight of the skater applied downwardly through the shoe to the coupling mechanism).

A further object is to provide such a coupling mechanism which not only will automatically effect a clamp-up operation in response to such downward pressure, but which also will continue its clamping operation even though the weight-pressure is removed. More specifically, and with particular reference to the application of the invention to skates and ski-couplings, the invention provides a coupling which will continue to secure the skate or ski to the user's shoe even when the foot is lifted from the ground, and will operated in reverse, transmitting support from the raised shoe to the skate or ski, resisting any tendency to return to the release-open position.

A still further object is to provide such a coupling, which in addition to its weight-responsive automatic closing action and its aforesaid self-maintaining clamping action for suspending a skate or a ski from a raised foot, can nevertheless be readily and instantaneously released by the simple action of grasping a portion of the coupling mechanism (or the skate or ski) in the wearer's hand while the foot is suspended, and pushing downwardly against that portion to break the self-clamping action.

Another object is to provide such a coupling mechanism, which, in addition to the automatic coupling and quick release features referred to above, embodies means for automatically adjusting or sizing its clamping jaws to the shoe of a wearer.

Other objects and advantages will become apparent in the ensuing specifications and appended drawings in which:

FIG. 1 is a longitudinal, vertical sectional view of a roller skate equipped with the coupling mechanism of my invention;

FIG. 2 is an inverted plan view of the same, partially in section, in the horizontal plane indicated by the line 2—2 of FIG. 1;

FIG. 3 is a transverse vertical sectional view taken on the line 3—3 of FIG. 1;

FIG. 4 is a transverse vertical sectional view in longitudinally offset vertical planes as indicated by the line 4—4 of FIG. 2;

FIG. 5 is a fragmentary detail sectional view of the hinge joint of the skate coupling mechanism;

FIG. 6 is a side view of a ski equipped with a ski binding embodying my invention;

FIG. 7 is a longitudinal vertical sectional view of the same;

FIG. 8 is a plan view of the same with parts broken away and shown in section to better illustrate the construction;

FIG. 9 is a fragmentary inverted plan view taken on the line 9—9 of FIG. 7;

FIG. 10 is a transverse sectional view taken on the line 10—10 of FIG. 7; and

FIG. 11 is a fragmentary vertical transverse sectional view taken on the line 11—11 of FIG. 7.

*Detailed Description—Skate Coupling—FIGS. 1–6*

Referring now to the drawings in detail, and in particular to FIGS. 1–5, I have shown therein, as an example of one form in which my improved coupling mechanism may be embodied, a roller skate embodying, in general, a sectional hinged platform comprising a toe section A and a heel section B; a hinge assembly C joining the sections A and B; a toe clamp jaw D attached to the toe platform A; a heel clamp jaw E attached to the rear platform section B; and forward and rear roller support units F and G respectively.

The toe platform section A, in its simplest form, comprises a rigid sole plate 15 having at its rear end three laterally spaced hinge eyes comprising a pair of eyes 16 at the respective sides thereof and a centrally disposed eye 17. In the central area of the plate 15 are a pair of slots 18, parallel to and in equally spaced relation to the major longitudinal axis of the skate on respective sides thereof. Sole plate 15 includes an integral lever portion 19 which extends rearwardly beyond the hinge eyes 16, 16 for the full width of the platform.

The heel platform section B comprises a rigid plate 25 having at its forward end a step 26 integrally joined to its body portion by an offset shoulder 27 having a depth corresponding to the thickness of forward platform plate 15, whereby the body portion 25 may be disposed in a common plane with the body portion 15 of the forward platform section A while the projecting lever 19 of section A rests solidly upon the step 26. In the forward margin of step 26 are a plurality of laterally spaced notches 20 which are aligned on the axis of hinge eyes 16, 17. Integrally joined to the forward margin of step 26 are a pair of laterally spaced hinge sleeves 28 which are dimensioned and positioned for reception in the spaces between hinge eyes 16 and 17 of forward platform unit A, which are received in notches 20.

Hinge unit C: A hinge pin 29 extends through the hinge eyes 16 and 17 and the hinge sleeves 28 to constitute therewith a hinge joining the forward platform section A to the rear platform section B along the forward margin of step 26 and permitting the two platform sections to break upwardly to the open position shown in phantom in FIG. 1, thus opening the clamp jaws F and G to receive a skater's shoe. The opening movement is limited by a stop device comprising a finger 30 secured to the center of lever 19, projecting downwardly through a slot 31 in the center of step 26, and having at its lower end a hook 32 for engagement against the under side of step 26 to determine the open position.

Toe clamp jaw D, which may be of drawn sheet metal construction, comprises a flat bottom 35 which is slidably seated upon the upper face of forward platform section A, and a hood portion 36 of arcuate transverse section, integrally joined to the forward and side margins of bottom 35 and rising therefrom in rearwardly arched direction to define with the bottom 35 a pocket in which the toe of a skater's shoe may be received. A pair of guide pins 37 are secured at their upper ends in the bottom 35 and project downwardly through the slots 18 in the forward platform plate 15. A pair of automatic sizing springs 38 are anchored at their forward ends to the lower ends of pins 37 and at their rear ends are anchored to stationary pins 39 fixed in the underside of the forward platform plate 15. The slots 18 permit the toe clamp jaw D to yield forwardly under toe pressure to a forward limit position indicated in phantom in FIG. 1 and the springs 38 function to draw the jaw D rearwardly into snug, holding engagement with the toe of the skater's shoe while the skate is being used.

The side margins of bottom 35 are straight and parallel as seen in FIG. 2, and are provided with integral slides 40 of L-section (FIG. 4) projecting downwardly therefrom, and embracing the parallel side margins of forward platform body 15, and slidably bearing against the marginal under faces of platform body 15 to maintain the bottom 35 snugly seated in slidable contact with the upper face of platform body 15.

Heel clamp jaw E comprises a body portion 42 of horseshoe shape, formed integrally with plate 25 or optionally formed as a separate part and suitably secured, as by rivets, to the rounded rear end margin and adjacent side margins of heel plate 25, and a pair of forwardly extending lateral cheeks 44, the central body portion 42 being curved forwardly in its upper portion to provide an overhanging lip 43 beneath which the rear portion of a shoe heel may be nested so as to cause the jaw E to cling to the heel.

To each of the axles 45 is secured a yoke 65 of a conventional cushion mount 66 having an upper bracket 67 suitably secured, as by rivets 68, to the underface of the respective sole plate 15 or heel plate 25 as the case may be.

*Operation—Skate Coupling*

In operation, when the hinge unit C is broken upwardly to the condition illustrated in phantom in FIG. 1, the jaws D and E will thereby be spread or opened as indicated in phantom in FIG. 1 at D' and E' respectively. This makes it possible for the skater to insert his toe into the toe clamp jaw at D' with his foot tilted upwardly at the heel and with the heel poised over the heel clamp jaw E, the spread or opened condition of the jaws normally being such that the heel can then be moved downwardly into the heel clamp jaw E, clearing the overhanging lip 43 thereof. If the shoe is large, it may be necessary to adjust the toe jaw D to a more forward position. In such a case, by first inserting the toe in jaw D, and then by tilting the foot upwardly and forwardly, the skate may be tilted upwardly around the forward roller mount F to a sufficiently upended position so that downward pressure of the toe in the toe jaw D will shift the latter forwardly, stretching the springs 38, until the heel will clear the lip 43 of heel clamp jaw E. This provides for automatic sizing of the coupling to the skater's foot. Pressure of the ball of the foot is then applied through the shoe sole to the lever 19 of the forward platform section A, pressing the hinged central portion of the platform downwardly until the lever 19 seats against the step 26 in the position shown in FIG. 1, bringing the sole plate 15 and heel plate 25 into a common plane as shown in full lines in FIG. 1. This closes the jaws D and E, with the lip 43 engaged over the heel and snugly grasping it and with the toe of the shoe snugly nested in the toe stirrup 36.

As the coupling is thus closed, the springs 38 will draw the toe jaw 36 snugly back against the toe of the skater's shoe and will at the same time draw the heel jaw E snugly forwardly around the heel of the shoe.

With the skates quickly applied to his shoes in the manner described above, a skater can immediately commence skating and as he lifts each foot from the floor, the skates will cling securely to the shoes without any tendency for the couplings to open. Any tendency of the platform to break upwardly at the hinge C would be resisted by the weight of the roller mounts F and G applied to the respective platform sections A and B inwardly of the points where the toe jaw D and heel jaw E are suspended from the toe and heel of the shoe respectively, thus resisting any tendency of the coupling to open. When the skater wishes to uncouple the skates from his shoes, it is only necessary to lift the feet in succession and, while a foot is lifted, to tilt the heel upwardly, grasp the rear roller mount G in the hand and pull downwardly, thus breaking the platform at the hinge C, whereupon the skate will drop from the shoe, the toe jaw D sliding downwardly from the downwardly pointed toe.

*Ski Binding—FIGS. 6–11*

Referring now to FIGS. 6–11, there is shown therein an adaptation of the coupling of my invention to a ski binding comprising respective forward and rear platform section A″ and B″ respectively, joined by a hinge C″ which is mounted upon a bracket H embedded and thus anchored in a base I which in turn is secured to the upper face of a ski J. Base I is of slightly compressible resilient material such as tire rubber or equivalent plastic material, and has a moderate cushioning function.

The forward platform section A″ in this case may have a fixed toe jaw D″ and the rear platform section B″ in that case is provided with a slidably adjustable heel jaw E″ having marginal slides 40″ slidably engaging the lateral margins of the heel plate 25″ and spring loaded by coil springs 38″ anchored to the heel plate by pins 39″ and to the heel clamp E″ by pins 37″ extending through slots 18″ in the heel plate 25″. Secured to the under side of the heel plate 25″ is a heel block 70. The base I includes a wedge shaped toe portion 71 sloping downwardly and forwardly from a peak 72 on which the hinge C is supported; a heel support 73 on which the heel block 70 is adapted to rest in the open position of the coupling; and an intermediate web 74 integrally joining the heel support 73 to the forward portion 71, a notch 75 being defined above the web portion 74 between the toe and heel portions 71 and 73.

The forward platform section A″ further includes a lever portion 19″ projecting beyond the hinge C″ and carrying a stop finger 30″ extending through a slot 31″ in heel plate 25″, the same as in FIGS. 1–5.

The hinge bracket H (FIGS. 7 and 10) comprises a foot portion 77 embedded in the peak portion 72 of the base I, a pair of arms 78 extending upwardly from foot portion 77, and a pair of hinge eyes 79 formed integrally on the upper ends of arms 78 and encircling the hinge pin 29" of the hinge C". Hinge eyes 16" and 17" correspond to similar parts in the hinge C of FIG. 2.

*Operation—Ski Binding*

In operation, the coupling mechanism of FIGS. 6–11 will assume the open position shown in FIG. 7 when detached from a ski shoe. In this position the toe section A" will be tilted downwardly, resting against the low forward end of base I; and the heel section B" will be tilted downwardly and rearwardly with its heel block 70 resting against heel support 73. To attach the ski to his shoe, the skier will tilt his toe downwardly and forwardly and insert it into the toe jaw D". He will then bring his heel to bear against the rearwardly projecting lever element 19" and will simultaneously force the heel downwardly while raising the toe, thus aligning the forward platform section A" with the rearward platform section B" while the latter remains tilted downwardly and rearwardly as in FIG. 7. To whatever extent necessary, the heel clamp E" will be drawn rearwardly to receive the heel in clearing relation thereto and will then be allowed to move forwardly under the pull of springs 38" to snugly engage the heel. With the two platform sections thus aligned in a common plane, the skier may now tilt forwardly around the hinge C" until the forward platform section A" again rests upon the forward end of base I, with the heel section elevated and tilted upwardly and rearwardly as in FIG. 6. This is the operating position in which the skier will use the skis, and the coupling will remain clinging to the shoe until such time as it is disengaged by holding down the toe jaw D" under toe pressure and simultaneously pushing downwardly against the heel section B" to break the hinge C" and lower the heel jaw E" back to the open position shown in FIG. 7.

In the event the toes of the skis should be caught in a snow drift, tripping up the skier, a similar action will occur, the heel sections B" coming back against the heel supports 73 and compressing them to the point where the hinges will be broken and the couplings released while the forward ends of the skis are held against tilting upwardly. As soon as the hinge is broken, the pull of the shoe between the jaws D" and E" will cause them to move to the fully open position.

I claim:

1. In a coupling for attachment to an object, in combination: a platform having, at its respective ends, jaws for coupling engagement with said object, said platform comprising a plurality of sections constituting respective end portions thereof, and a hinge joining the inner ends of said sections for upward breaking movement in which said jaws have opening movement to receive said object; one of said platform sections having a lever portion projecting over said hinge and engageable with the other platform section in response to pressure thereon by said object, to limit downward breaking of the hinge so as to rigidify the platform for holding the object with the jaws closed in gripping engagement therewith, said one platform section comprising a flat plate which includes said lever as an integral co-planar portion thereof: the other platform section comprising a body portion in the form of a flat plate, an extension on the inner end thereof projecting beneath said lever portion and attached to said hinge at its end, and an offset shoulder joining said extension to and offsetting it below said body portion so as to seat against the under face of said lever portion with said one platform section including said lever portion, disposed in a common plane with said other platform sections; said extension being provided with a longitudinally extending slot, and including a stop finger rigidly attached to said lever portion, projecting downwardly through said slot and having at its lower end a stop hook projecting laterally, engageable with the underside of said extension to limit the upward breaking of the hinge at the jaw-open position, and spaced beneath said extension when the platform sections are in co-planar, object supporting position.

2. A coupling as defined in claim 1, including means slidably mounting one of said coupling jaws to its respective platform section for longitudinal sliding movement to vary the distance between the two jaws; and means spring-loading said slidably mounted jaw toward the other jaw for sizing the coupling to said objects.

3. In a coupling for attaching a locomotion device to a human foot: a platform providing a support for engagement by a shoe, said platform comprising respective toe and heel sections in the form of plates, and a hinge joining adjacent ends of said plates for upward breaking movement, one of said plates having an integral lever portion extending over said hinge and adapted to seat downwardly against the adjacent end portion of the other plate to rigidify said platform in a position wherein said plates are substantially aligned to support said shoe; a pair of coupling jaws including a heel jaw attached to said heel plate and having at its upper end a lip curved forwardly to overhang and grasp the heel of said shoe, and a toe jaw attached to said toe plate and adapted to receive the toe of said shoe, said jaws executing an opening movement in response to upwardly breaking of said hinge, to receive the shoe and closing around the toe and heel of the shoe when said hinge moves downwardly to align said platform sections in response to weight-loaded pressure of the shoe against said lever portion, said jaws being maintained in said closed relation by said weight-loaded engagement one of said jaws having at its respective sides, parallel slides of channel section receiving parallel side marginal portions of the respective platform section and thereby slidably mounting said one jaw for longitudinal movement with respect to the other jaw to adjust the spacing between the jaws for shoes of varying sizes; and further including spring means acting between said one jaw and said respective platform section and loading said one jaw for movement toward the other jaw to adjust the jaws into snug engagement with the toe and heel of a shoe; said spring means comprising a pair of coil springs disposed beneath said one platform section, means anchoring the ends of said springs adjacent said hinge to said one platform section, and anchor studs attached to the bottom of said one jaw, projecting downwardly through said one platform section, and attached to the ends of said springs remote from the hinge to draw the said one jaw toward the hinge, said one platform section having therein, laterally spaced longitudinally extending slots through which said anchor studs project for longitudinal movement.

4. In a roller skate-to-shoe coupling: a shoe-supporting platform comprising respective toe and heel sections, a hinge joining adjacent ends of said sections for upward breaking movement from a shoe supporting position wherein said sections are substantially aligned in a common horizontal plane, one of said platform sections including an integral lever portion projecting over said hinge and the other of said platform sections having a downwardly offset extension by which it is attached to said hinge, said extension providing a seat against which the under side of said lever will seat in said substantially aligned positions of the sections to rigidify the platform for shoe supporting operation, said lever portion being positioned for engagement by the shoe sole so as to be weight-loaded through the shoe sole to maintain said rigidified condition of the platform; a pair of coupling jaws consisting of a heel jaw secured to the rear end of said heel section of the platform section and a toe jaw having means slidably attaching it to said toe section for longitudinal movement to vary the distance between the two jaws; said toe section of the platform having laterally spaced longitudinally extending slots therein, a pair of anchor pins secured to the bottom of said toe jaw and projecting downwardly through said slots; and a pair of coil springs disposed beneath said toe section with their forward ends anchored to the lower ends of said anchor pins, and means anchoring the rear ends of said coil springs to the under side of said toe section, whereby said toe jaw is spring loaded toward said heel jaw for sizing said coupling jaws to shoes of varying sizes; said jaws effecting opening movement to receive the shoe in response to upward breaking of said hinge and effecting closing movement around the toe and heel of the shoe when the wearer of the shoe steps down upon said lever portion to return said platform to said rigidified condition, said toe jaw being shaped to receive the toe of a shoe when the jaws are opened as aforesaid, to couple itself to the toe sufficiently to permit the skate to be tilted upwardly around the forward roller support, and then responding to forward and downward pressure of the toe by sliding forwardly with respect to said toe section of the platform to permit the heel to clear said heel jaw.

5. Coupling mechanism for coupling a ski to a ski boot comprising: a base of compressible cushioning material for attachment to a ski; a hinge including a bracket mounted in said base; a platform comprising respective toe and heel sections joined by said hinge at their adjacent ends and having at their remote ends, respective toe and heel jaws for respectively receiving the toe and heel of a ski boot, one of said platform sections having an integral lever portion projecting over said hinge and adapted to seat downwardly against the adjacent portion of the other platform section to rigidify said platform in supporting engagement with the bottom of the ski boot, said base having a wedge shaped forwardly and downwardly inclined forward portion against which the toe section of the platform may rest in a downwardly and forwardly inclined position, and having a heel supporting portion against which the heel section of the platform may rest in a downwardly and rearwardly inclined position, said lever portion diverging upwardly from the adjacent platform section when said platform sections are in said respective downwardly inclined positions, and said coupling jaws being opened to receive a ski boot when said platform sections are thus downwardly inclined, downward pressure of the ski boot against said lever portion being effective to tilt said forward platform section upwardly into substantial alignment with the rearward platform section to effect closing of said jaws around the toe and heel of the ski boot, thereby attaching said coupling to the ski boot.

6. A ski binding coupling as defined in claim 5, including means slidably attaching said heel jaw to the heel section of the platform and means spring loading said heel jaw for forward movement toward the hinge to snugly close the respective coupling jaws over the toe and heel, with a sizing operation.

7. In a coupling for attachment to and for support of an object, in combination: an elongated platform having, beneath its respective end portions, longitudinally spaced supporting elements for engagement against a supporting surface and having above said respective end portions, jaws for coupling engagement with respective opposite extremities of said object, said paltform comprising a plurality of sections constituting respective end portions thereof, and a hinge joining the inner ends of said sections for upward breaking movement in which said jaws have opening movement to receive and to release said object, the axis of said hinge being disposed transversely of the longitudinal major axis of said platform, between said supporting elements and sufficiently spaced toward the midpoint therebetween so that the weight of said object bearing down upon said platform will be applied directly to one of said sections and, through said hinge, to the other section for loading both of said sections downwardly at said hinge axis; said jaws being so positioned relative to said supporting elements and so secured to said respective platform end portions, as to be forcibly tilted toward one another for gripping engagement with said object as the result of tilting of said platform sections in opposite directions in response to said downward loading at said hinge axis, with the ends of said platform fulcrumed on said supporting elements; one of said platform sections having a lever portion projecting over said hinge and engageable with the other platform section in response to said downward loading, to limit downward breaking of the hinge and to thereby rigidify the platform for holding the object with the jaws closed in gripping engagement therewith.

8. In a coupling for attaching a locomotion device to a human foot: a platform providing a support upon which a shoe may rest, said platform comprising respective toe and heel sections; respective supporting elements upon which the respective sections are mounted, said supporting elements being disposed beneath the respective forward and rear ends of said platform; a hinge joining adjacent ends of said platform for upward breaking movement upon a transverse axis disposed between said supporting elements and sufficiently spaced therefrom toward the midpoint therebetween, so that the weight of a wearer's foot in said shoe, bearing downwardly against said platform, will be applied directly to one of said platform sections and, through said hinge, to the other of said sections so as to load both of the sections downwardly between said supporting elements; one of said platform sections having an integral lever portion extending over said hinge and adapted to seat downwardly against the adjacent end portion of the other platform section to rigidify said platform in a position wherein said sections are substantially aligned to support said shoe; a pair of coupling jaws attached to the respective platform sections at the respective ends of the platform, said jaws projecting upwardly therefrom for coupling reception of the toe and heel of said shoe and being in such projecting relation to said respective platform sections as to execute an opening movement in response to upward breaking of said hinge, to receive the shoe or to release it, and closing around the toe and heel of said shoe as said hinge moves downwardly to align said platform sections in response to the weight-loaded pressure of the shoe against said lever portion, said supporting elements functioning as fulcrums about which said platform sections tilt toward alignment so as to effect said closing of the jaws, said jaws being maintained in said closed relation by said weight-loaded engagement.

9. A coupling as defined in claim 8 wherein one of said jaws has at its respective sides, parallel slides of channel section receiving parallel side marginal portions of the respective platform section and thereby slidably mounting said one jaw for longitudinal movement with respect to the other jaw to adjust the spacing between the jaws for shoes of varying sizes; and further including spring means acting between said one jaw and said respective platform section and loading said one jaw for movement toward the other jaw to adjust the jaws into snug engagement with the toe and heel of a shoe.

10. In a roller skate: a shoe supporting platform comprising respective toe and heel sections; roller supports on which the respective sections are mounted adjacent the respective ends of said platform; a hinge joining adjacent inner ends of said platform for upward breaking movement on a transverse axis disposed between said roller supports and sufficiently spaced therefrom toward the midpoint therebetween so that the weight of a wearer's foot in said shoe, bearing downwardly against said platform, will be applied directly to one of said platform sections and, through said hinge, to the other of said sections so as to load both of the sections downwardly between said roller supports; one of said platform sections having an integral lever portion extending over said hinge and adapted to seat downwardly against the adjacent end portion of the other platform section to rigidify said platform in a position wherein said sections are substantially aligned to support said shoe; a pair of coupling jaws attached to the respective platform sections at the respective ends of the platform, said jaws projecting upwardly therefrom for coupling reception of the toe and heel of said shoe and being in such projecting relation to said respective platform sections as to execute an opening movement in response to upward breaking of said hinge, to receive the shoe or to release it, and closing around the toe and heel of said shoe as said hinge moves downwardly to align said platform sections in response to the weight-loaded pressure of the shoe against said lever portion, said supporting elements functioning as fulcrums about which said platform sections tilt toward alignment so as to effect said closing of the jaws, said jaws being maintained in said closed relation by said weight-loaded engagement.

References Cited in the file of this patent

UNITED STATES PATENTS

| | | |
|---|---|---|
| 30,237 | Masterson | Oct. 2, 1860 |
| 154,175 | Edwards | Aug. 18, 1874 |
| 454,040 | Fresse | June 16, 1891 |
| 469,507 | Spencer | Feb. 23, 1892 |
| 637,650 | Northrup | Nov. 21, 1899 |
| 1,260,124 | Ashley | Mar. 19, 1918 |
| 1,617,984 | Biggio | Feb. 15, 1927 |
| 1,673,405 | Davis | June 12, 1928 |
| 1,854,188 | Gregory | Apr. 19, 1932 |
| 1,857,360 | Coldwell | May 10, 1932 |
| 1,934,535 | Hast | Nov. 7, 1933 |
| 1,970,542 | Browning | Aug. 21, 1934 |
| 2,037,964 | Chochkoff | Apr. 21, 1936 |
| 2,044,211 | Hedelund | June 16, 1936 |
| 2,094,667 | Parish | Oct. 5, 1937 |
| 2,103,737 | Tappe | Dec. 28, 1937 |
| 2,297,870 | Brannon | Oct. 6, 1942 |
| 2,865,644 | Levin | Dec. 23, 1958 |
| 2,950,118 | Sharpe | Aug. 23, 1960 |

FOREIGN PATENTS

| | | |
|---|---|---|
| 94,848 | Austria | Nov. 10, 1923 |
| 168,458 | Austria | June 11, 1951 |
| 42,053 | Switzerland | Dec. 14, 1907 |
| 251,671 | Switzerland | Aug. 16, 1948 |